UNITED STATES PATENT OFFICE.

SAMUEL PEACOCK, OF CHICAGO, ILLINOIS, ASSIGNOR TO THE SOUTHERN ELECTRO-CHEMICAL COMPANY, OF NEW YORK, N. Y., A CORPORATION OF NEW JERSEY.

PROCESS OF MAKING PHOSPHORUS TRIOXID.

1,015,707.  Specification of Letters Patent.  Patented Jan. 23, 1912.

No Drawing.  Application filed July 12, 1910. Serial No. 571,613.

*To all whom it may concern:*

Be it known that I, SAMUEL PEACOCK, a citizen of the United States, residing at Chicago, in the county of Cook and State of Illinois, have invented certain new and useful Improvements in Processes of Making Phosphorus Trioxid; and I do hereby declare the following to be a full, clear, and exact description of the invention, such as will enable others skilled in the art to which it appertains to make and use the same.

This invention relates to the production of phosphorus oxids from crude materials such as phosphate rock, bone ash or other cheap sources of phosphorus, and has for its object to provide a method of manufacture which will be more efficient and less expensive than the methods heretofore proposed.

It is well known that mineral phosphate occurs in large deposits and is inexpensive, but it is not pure. Its composition may be fairly said to be about 70 to 75 per cent. tri-calcium phosphate, and about 25 to 30 per cent. carbonate of lime, alumina, silica, iron oxids, etc. It is further well known that the oxids of phosphorus are manufactured at present chiefly by treating phosphate rock, bone ash, etc., with a sufficient quantity of sulfuric acid to combine with all of the lime of the phosphate. The reaction may be stated to be substantially as follows:

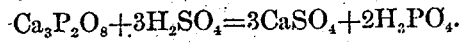

$$Ca_3P_2O_8 + 3H_2SO_4 = 3CaSO_4 + 2H_3PO_4.$$

The lower oxid of phosphorus is also generally made by reducing the higher oxid, or by the partial oxidation of the phosphorus. It is further well known that this process of producing phosphorus oxids is costly, for valuable sulfuric acid is used up in forming sulfate of lime which has practically no commercial value. The phosphoric acid, however, that is thus produced is recovered as such by a complex system of lixiviation and concentration. Furthermore, upon extracting the acidulated phosphate with water, although the phosphorus oxids are readily extracted, yet other soluble sulfates such as magnesium, iron and aluminium sulfates as well as more or less sulfates of lime go into solution. These sulfates are generally separated out as far as possible by concentration in lead lined vessels, but it is recognized that such treatment is very costly, and is also not wholly efficient. The magnesia, the iron oxids, as well as the alumina present are finally separated out as phosphates and therefore cause a loss of phosphorus. In addition to the above, the final product is invariably quite impure if the cheap mineral phosphates have been used as a base. According to my invention, however, the use of sulfuric acid is dispensed with, as well as the lixiviation and concentration stages of the process which are necessary in the sulfuric acid treatment. Furthermore, in my invention there is no danger of iron, alumina, or magnesium salts of phosphorus being formed, and there is therefore no corresponding loss of phosphorus values.

I have discovered that when calcium phosphid is mixed with a phosphate of lime, iron, or alumina, and the mixture is heated to a high temperature, that practically all of the phosphorus in the mixture is volatilized in the form of oxids. The reaction may be stated substantially as follows:

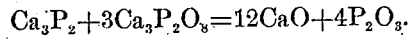

$$Ca_3P_2 + 3Ca_3P_2O_8 = 12CaO + 4P_2O_3.$$

I have found that this reaction is so complete as to be practically quantitative. The oxid of phosphorus in its state of volatilization is readily collected by any suitable process or it may be converted into phosphoric acid in any suitable and well known manner. I have further discovered that not only may mixtures of phosphids and phosphates be used as above to free the oxids of phosphorus from its compounds, but that also free oxids of phosphorus are produced to a greater or less degree in the manufacture of calcium phosphid, provided the carbon be not used in excess in the furnace. The conversion, however, of crude phosphates into free phosphorus oxids is not nearly so complete by such treatment as could be desired. I therefore prefer to make calcium phosphid in a separate operation and mix some of the same with three times its equivalent of tri-calcium phosphate, whereupon I heat the mixture to at least a light red temperature.

The calcium phosphid may be conveniently manufactured in an ingot furnace precisely as calcium carbid is now manufactured.

It is evident that those skilled in the art will be enabled to vary the details of carrying out my process within wide limits without departing from the spirit of my invention, and, therefore, I do not wish to be limited to such features except as may be required by the claims.

What I claim is:

1. The process of producing phosphorus trioxid which consists in mixing an alkaline earth phosphid with an alkaline earth phosphate; heating the mixture to a temperature sufficient to evolve an oxid, the trioxid of phosphorus; and in finally recovering the oxid thus obtained, substantially as described.

2. The process of producing phosphorus trioxid which consists in mixing a calcium phosphid with a phosphate; in heating the mixture until the trioxid of phosphorus is formed; and in finally suitably recovering the oxid thus obtained, substantially as described.

3. The process of producing phosphorus trioxid which consists in mixing calcium phosphid with substantially three times its equivalent of tri-calcium phosphate; raising the mixture to a red heat; and in recovering the oxid of phosphorus thus obtained, substantially as described.

In testimony whereof, I affix my signature, in presence of two witnesses.

SAMUEL PEACOCK.

Witnesses:
R. J. BOYLAN,
T. A. WITHERSPOON.